(12) United States Patent
Valle et al.

(10) Patent No.: US 8,029,396 B2
(45) Date of Patent: Oct. 4, 2011

(54) FRONT DERAILLEUR FOR A BICYCLE

(75) Inventors: Maurizio Valle, Vicenza (IT); Leopoldo Lazzarin, Vicenza (IT)

(73) Assignee: Campagnolo S.R.L., Vicenza (IT)

( * ) Notice: Subject to any disclaimer, the term of this patent is extended or adjusted under 35 U.S.C. 154(b) by 147 days.

(21) Appl. No.: 12/113,713

(22) Filed: May 1, 2008

(65) Prior Publication Data

US 2008/0274845 A1 Nov. 6, 2008

(30) Foreign Application Priority Data

May 3, 2007 (IT) .............................. MI2007A0883

(51) Int. Cl.
*F16H 9/00* (2006.01)
*F16H 59/00* (2006.01)
*F16H 61/00* (2006.01)
*F16H 63/00* (2006.01)

(52) U.S. Cl. ........................................... 474/82; 474/80

(58) Field of Classification Search .................. 474/80, 474/82; 280/260, 261; 74/469
See application file for complete search history.

(56) References Cited

U.S. PATENT DOCUMENTS

| | | | | | |
|---|---|---|---|---|---|
| 4,030,374 | A | * | 6/1977 | Isobe | 474/82 |
| 4,223,562 | A | * | 9/1980 | Nagano et al. | 474/82 |
| 4,226,130 | A | * | 10/1980 | Isobe | 474/82 |
| 4,259,873 | A | * | 4/1981 | Nagano et al. | 474/82 |
| 4,330,137 | A | * | 5/1982 | Nagano | 280/238 |
| 4,756,704 | A | * | 7/1988 | Nagano | 474/144 |
| 4,778,436 | A | * | 10/1988 | Nagano | 474/80 |
| 5,037,355 | A | * | 8/1991 | Kobayashi | 474/82 |
| 5,312,301 | A | * | 5/1994 | Kobayashi | 474/80 |
| 5,389,043 | A | * | 2/1995 | Hsu | 474/80 |
| 6,234,927 | B1 | * | 5/2001 | Peng | 474/82 |
| 6,629,903 | B1 | * | 10/2003 | Kondo | 474/82 |
| 6,641,495 | B2 | * | 11/2003 | Valle | 474/80 |
| 6,986,723 | B2 | * | 1/2006 | Valle | 474/80 |
| 7,014,584 | B2 | * | 3/2006 | Nanko et al. | 474/80 |
| 7,081,058 | B2 | * | 7/2006 | Nankou | 474/80 |
| D555,050 | S | * | 11/2007 | Hanamura | D12/124 |
| 7,306,531 | B2 | * | 12/2007 | Ichida et al. | 474/70 |
| 7,331,890 | B2 | * | 2/2008 | Ichida et al. | 474/80 |
| 2002/0034996 | A1 | * | 3/2002 | Valle | 474/82 |
| 2004/0127314 | A1 | * | 7/2004 | Nanko et al. | 474/80 |
| 2004/0157690 | A1 | * | 8/2004 | Nankou | 474/80 |
| 2005/0239587 | A1 | * | 10/2005 | Ichida et al. | 474/82 |
| 2007/0135249 | A1 | | 6/2007 | Nanko | |

FOREIGN PATENT DOCUMENTS

| | | |
|---|---|---|
| DE | 9410177 U1 | 11/1994 |
| EP | 1433696 A | 6/2004 |
| EP | 1798143 A2 | 6/2007 |
| FR | 2415037 A | 8/1979 |

* cited by examiner

*Primary Examiner* — Michael Mansen
*Assistant Examiner* — Henry Liu

(57) ABSTRACT

A derailleur including an articulated quadrilateral mechanism, having four parallel articulation axes is provided. At a first articulation axis, between a fixed member and a first connecting rod, the fixed member includes a first forked structure embracing the first connecting rod. The first forked structure includes two opposite flanges having respective holes aligned along the first articulation axis, and the first connecting rod includes a hole aligned with the first articulation axis. A pin is inserted through the two holes of the first forked structure and the first connecting rod. The use of the fixed member creates a more favorable distribution of the stresses induced in the first connecting rod and the pin by the traction of the derailleur control cable.

22 Claims, 9 Drawing Sheets

FRONT DERAILLEUR FOR A BICYCLE

FIELD OF INVENTION

The present invention concerns a front derailleur for a bicycle.

BACKGROUND

Front derailleurs are used to move a bicycle chain during travel from one toothed wheel of the bottom bracket to another one having a different diameter. This process functions to carry out gearshifting, varying the transmission ratio.

Known derailleurs typically comprise a chain guide positioned above the bicycle chain and a chain guide positioning mechanism, normally an articulated parallelogram mechanism, which is fixed to the bicycle frame along the tube that connects the bottom bracket to the saddle (seat-tube).

The chain guide is formed from an inner plate and an outer plate that face one another and are substantially parallel. The inner plate acts by pushing upon the chain to make it pass from a wheel having a small diameter to one having a larger diameter (upward gearshifting), and the outer plate acts by pushing upon the chain to make it pass from a wheel having a larger diameter to one having a smaller diameter (downward gearshifting).

SUMMARY

The present invention concerns, a front bicycle derailleur having a fixed member and a mobile member provided with a bicycle chain-guide. A connecting rod is hinged to the fixed member about a first articulation axis and to the mobile member about a second articulation axis. An actuation arm for controlling the derailleur is provided with a driving area, and the connecting rod transfers force exerted on the driving area to the mobile member, causing it to move. At the first articulation axis, the fixed member comprises a forked structure that embraces the first connecting rod.

DETAILED DESCRIPTION OF THE PREFERRED EMBODIMENTS

Introduction to the Embodiments

Figure 1:
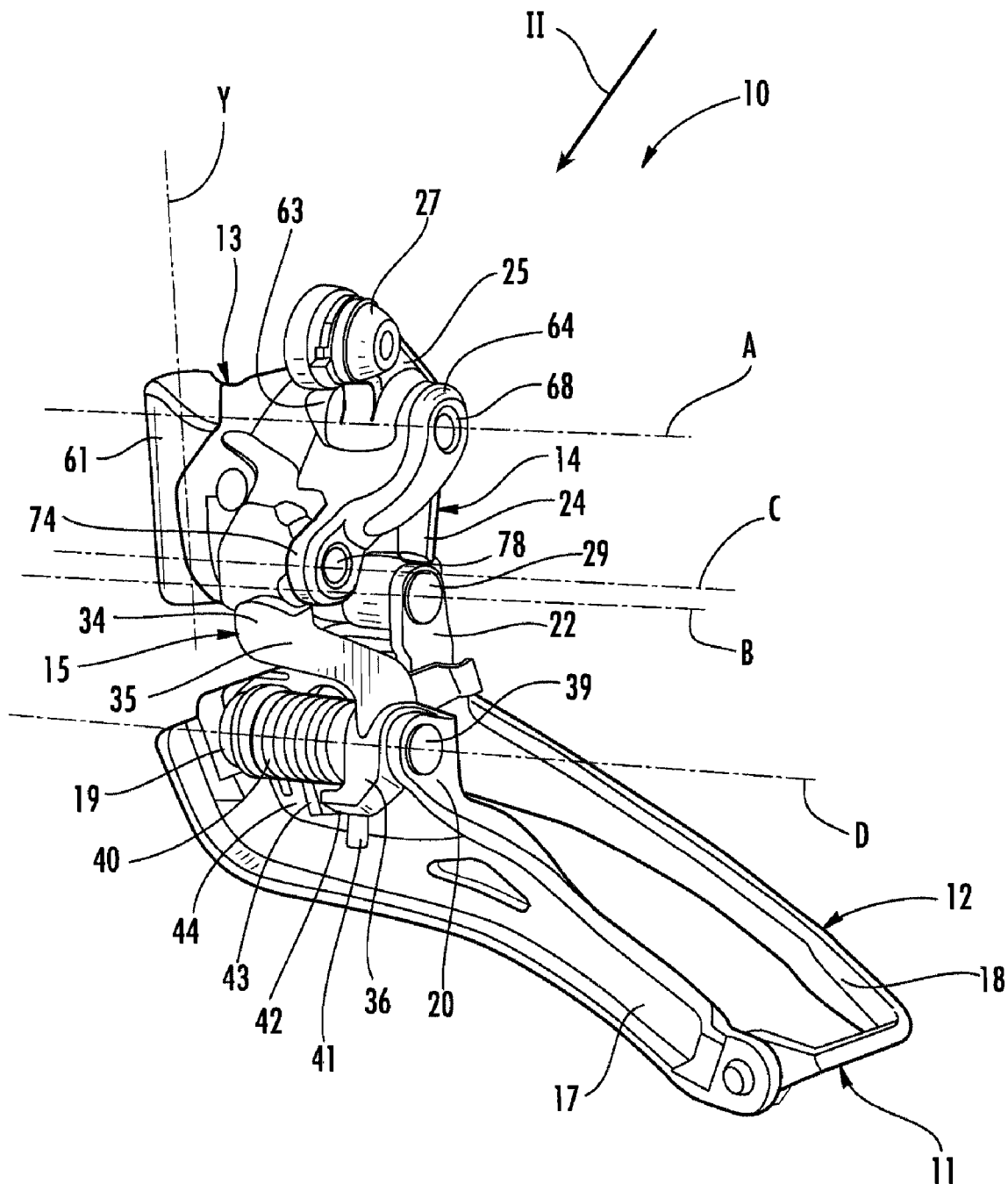
FIG. 1 is a perspective view of a derailleur according to a first embodiment of the invention.

The present invention concerns a front derailleur for a bicycle. The claimed front derailleur includes a mobile member provided with a chain-guide suitable for sliding engagement with a transmission chain of the bicycle. The mobile member is mobile between a first position and at least one second position. Also included is a fixed member, suitable for being fixed to a part of the bicycle frame. A first connecting rod, and a second connecting rod are hinged to the fixed member and to the mobile member, about four substantially parallel articulation axes so as to form an articulated quadrilateral, able to be deformed so as to move the chain-guide between the first and at least one second position. An actuation arm of the first connecting rod is provided with a driving area for controlling the derailleur through application of a thrust to the actuation arm so as to deform the deformable quadrilateral. At a first of the four articulation axes between the fixed member and the first connecting rod the fixed member includes a first forked structure that embraces the first connecting rod. The first forked structure is defined by opposite flanges.

It has been found that providing the fixed member of a bicycle front derailleur with a forked structure that surrounds the first connecting rod creates a more favorable distribution of the stresses caused by the traction of a derailleur control cable. In the derailleur of the present invention, the stress exerted on the actuation arm of the first connecting rod during the actuation of the control cable is distributed in a central area of the pin, because the ends of the pin are supported by the fixed member. This configuration simplifies the process of sizing the actuation arm, which can be made narrower or longer without jeopardizing its strength. The weight of the arm can also be reduced without this jeopardizing its mechanical strength. Moreover, the improved distribution of stresses also reduces the deformability of the biased parts, allowing for better rotational coupling and a consequent lower wear on the pins.

Preferably, the driving area on the actuation arm of the first connecting rod comprises a hook for receiving a derailleur control cable, and more preferably the derailleur comprises an elastic return member, acting on the articulated quadrilateral in a direction to push the chain-guide towards said first position, in which the thrust applied by the cable to the hook acts in the opposite direction to the return of the elastic return member. Alternatively, in a motorized derailleur (also known as an automatic or electric derailleur) the driving area can be a toothed sector engaged with a driving screw.

Preferably, the flanges of the first forked structure are provided with respective holes aligned along the first articulation axis and the first connecting rod comprises a hole aligned with the first articulation axis. A pin is inserted through the two holes of the first forked structure and further through the hole of the first connecting rod. Alternatively, it is possible for the pin to be formed as one piece with the connecting rod and for the flanges to consequently be in two pieces, so as to permit mounting on the pin. Alternatively, the pin may be formed in two parts and be formed as a single piece with the flanges and the connecting rod may consequently be formed as two pieces, so as to permit mounting on the pin.

Preferably, the first connecting rod comprises a main arm extending between the first and second of said four articulation axes, between the first connecting rod and the mobile member, and the main arm and the actuation arm substantially extend in the same plane perpendicular to the four articulation axes. The first connecting rod therefore has a very regular and uniform configuration, such as to regularly and uniformly transmit the stresses induced by the control cable to the pin.

Preferably, at a third of said four articulation axes between the fixed member and the second connecting rod, the fixed member comprises a second forked structure that embraces the second connecting rod, and the second forked structure comprises two opposite flanges. More preferably, the flanges of the second forked structure are provided with respective holes aligned along the third articulation axis, the second connecting rod comprises a hole aligned with the third articulation axis, and a pin is inserted through the two holes of the second forked structure and further through the hole of the second connecting rod. Alternatively, it is possible for the pin to be formed as a single piece with the connecting rod and for the flanges to consequently be formed as separate pieces, so as to permit mounting on the pin. Alternatively, it is possible for the pin to be formed in two parts and be formed as a single piece with the flanges and for the connecting rod to consequently be formed as two pieces, so as to permit mounting on the pin.

Alternatively, at a third of said four articulation axes between the fixed member and the second connecting rod, the fixed member comprises a cantilevered pin, and the second connecting rod comprises a hole aligned with the third articulation axis, inserted on the cantilevered pin of the fixed member.

Preferably, at a fourth of said four articulation axes between the second connecting rod and the mobile member, the mobile member comprises two opposite flanges perforated along the fourth articulation axis, in which the second connecting rod comprises a hole aligned with the fourth articulation axis, and in which a pin is inserted into the flanges and into the hole of the second connecting rod. More preferably, the elastic return member is a helical spring, mounted on the pin and provided with two ends, one engaged with an abutment tooth formed on the second connecting rod, the other engaged with an abutment portion formed on the mobile member.

Preferably, the fixed member comprises a cylindrical portion for a braze-on attachment to the bicycle frame. Alternatively, the fixed member comprises two semi-circular portions articulated together and a locking element for locking such semi-circular portions about the part of bicycle frame. According to this embodiment, the fixed member preferably is formed as a single piece with one of the two articulated semi-circular portions.

Preferably, the second connecting rod is substantially S-shaped and extends between the third and a fourth of said four articulation axes, between a first plane at the third articulation axis and a second plane at the fourth articulation axis. The first and the second planes are perpendicular to the four articulation axes and spaced apart by a predetermined distance.

Further characteristics and advantages of a derailleur according to the invention shall become clearer from the following description of some preferred embodiments thereof, made with reference to the attached drawings.

DETAILED DESCRIPTION

FIGS. 1 to 4 show a derailleur 10 suitable for being mounted on a bicycle according to one preferred embodiment of the invention. The derailleur 10 comprises a chain guide 11, which is suitable for sliding engagement with a transmission chain of the bicycle, to move the chain between a first position and at least one second position, corresponding to distinct transmission ratios.

Figure 3:
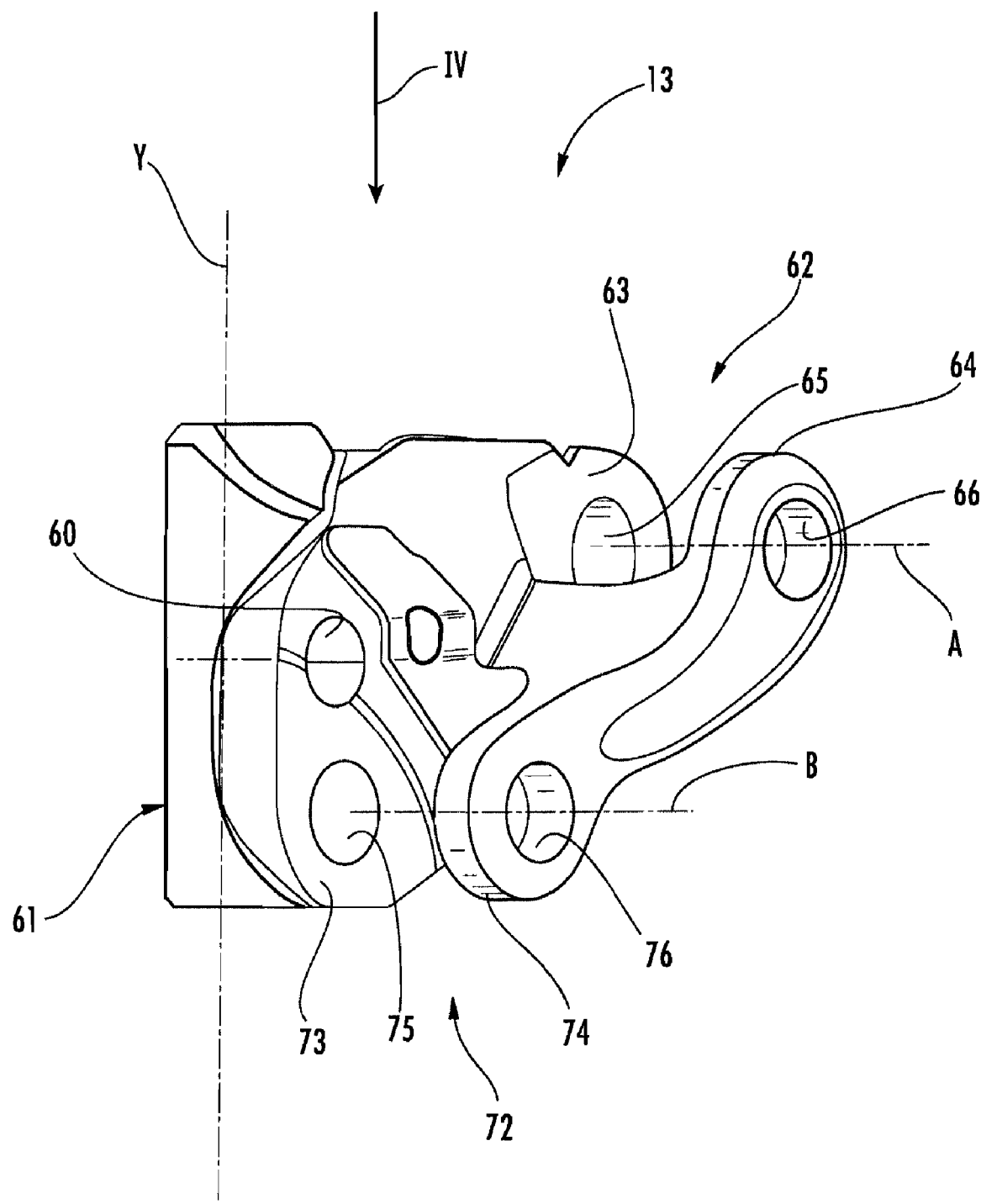
FIG. 3 is an enlarged perspective view of the fixed member of the derailleur of FIG. 1.
Figure 4:
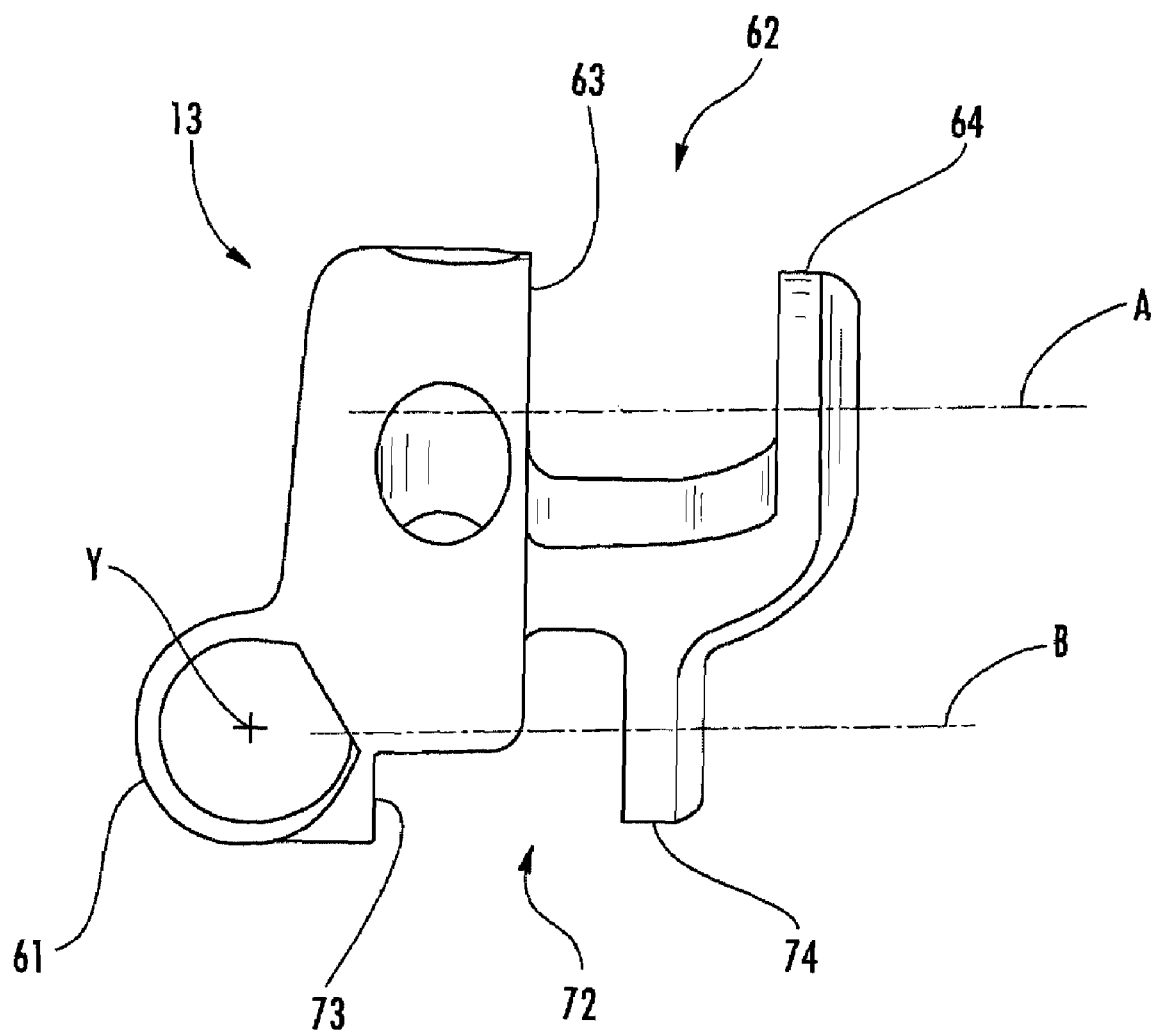
FIG. 4 is a view of the fixed or stationary member of FIG. 3, taken from direction IV.

As shown in FIGS. 3 and 4, the chain guide 11 forms part of a mobile member 12, or cage, of an actuation mechanism that also includes a fixed member 13, a first connecting rod 14 (or outer connecting rod), and a second connecting rod 15 (or inner connecting rod). The terms "inner" and "outer," just like "lower" and "upper" as used hereafter, refer to the position taken up with respect to the mounting position of the derailleur in the bicycle.

The fixed or stationary member 13, the mobile member 12, and the two connecting rods 14 and 15 are articulated together along four parallel articulation axes A, B, C, D, such that they form an articulated parallelogram. More precisely, the fixed member 13 and the first connecting rod 14 are articulated about the first axis A; the first connecting rod 14 and the mobile member 12 are articulated about the second axis B; the fixed member 13 and the second connecting rod 15 are articulated about the third axis C; and the second connecting rod 15 and the mobile member 12 are articulated about the fourth axis D.

The mobile member 12 comprises an inner plate 17 facing an outer plate 18, which form the chain guide 11. The mobile member 12 is provided with lower flanges 19, 20 perforated along the axis D for connection to the second connecting rod 15, and with upper flanges 21, 22 for connection to the first connecting rod 14.

The first connecting rod 14 comprises a main arm 24, extending between the axes A and B, and an actuation arm 25, at the end of which a driving area is provided, in particular a hook 27 for receiving a derailleur control cable (not shown). The first connecting rod 14 is configured so that the main arm 24 and the actuation arm 25 substantially extend in a plane perpendicular to the four articulation axes A, B, C, D. The main arm 24 and the actuation arm 25 are substantially collinear with each other are substantially the same length.

Figure 2:
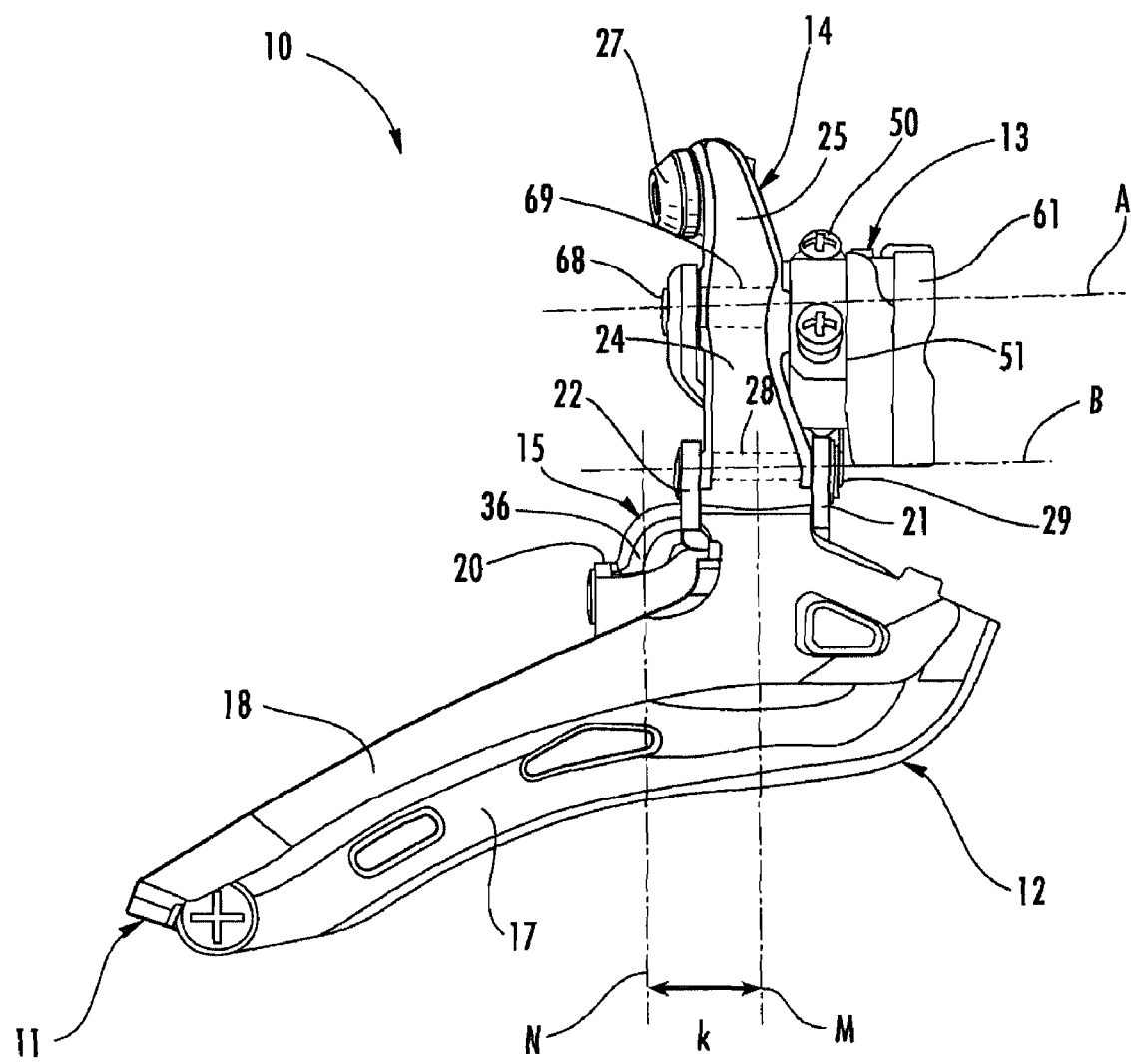
FIG. 2 is a view of the derailleur of FIG. 1, taken from direction II.

At the axis B, a pin 29 rotatably connects the flanges 21 and 22 to a hole 28 made in the connecting rod 14 (see FIG. 2).

The second connecting rod 15 is substantially S-shaped and has an upper portion 34 articulated to the fixed member 13 about the third articulation axis C, an intermediate portion 35 and a lower portion 36 articulated to the mobile member 12 about the fourth articulation axis D. With respect to the common direction of the axes A, B, C, D, the upper and lower portions 34 and 36 of the connecting rod 15 extend in distinct planes M and N, spaced apart by a distance k.

At the axis D, a pin 39 rotatably connects the flanges 19 and 20 to a hole made in the lower portion 36 of the connecting rod 15. About the axis D, an elastic return member, preferably a preloaded helical spring 40, is arranged. The spring 40 is provided with an end 41 abutting a tooth 42 of the lower portion 36 of the second connecting rod 15 and with an end 43 abutting a portion 44 of the mobile member 12. The spring 40 keeps the articulated parallelogram mechanism pushing towards a rest position, which is normally the position in which the chain guide 11 is closest to the bicycle, and the axis A is at its farthest possible position from the axis D.

A pair of screws 50 and 51 are adjustably mounted in respective threaded holes on the fixed member 13 and cooperate with the upper portion 34 of the second connecting rod 15 to define the extreme rotational positions of the connecting rod 15 itself and therefore the extreme deformation positions of the articulated parallelogram and of its parts, including in particular the position of the chain guide 11. These extreme positions are adjustable through screwing and unscrewing of the screws 50 and 51.

The fixed member 13 (which can be seen separate from the rest of the derailleur in FIGS. 3 and 4) comprises a cylindrical surface 61 for attachment to a portion of the seat-tube of the bicycle frame of a shape matching the cylindrical surface 61 (braze-on attachment). The cylindrical surface 61 extends around a central axis Y.

The fixed member 13 further comprises, at the first axis A, a first forked structure 62 that embraces the first connecting rod 14. The first forked structure 62 is formed from a first flange 63 facing a second flange 64, each provided with respective holes 65 and 66 aligned along the axis A. A pin 68 is inserted through the holes 65 and 66 and further through a hole 69 aligned with them formed in the first connecting rod 14, so as to provide the articulated coupling between the fixed member 13 and the connecting rod 14.

The fixed member 13 also comprises, at the third axis C, a second forked structure 72 that embraces the second connecting rod 15. The second forked structure 72 formed from a first flange 73 facing a second flange 74. The flanges are provided with respective holes 75 and 76 aligned along the axis C. A pin 78 is inserted through the holes 75 and 76 and further through a hole aligned with them formed in the upper portion 34 of the second connecting rod 15 to provide the articulated coupling between the fixed member 13 and the connecting rod 14. As best shown in FIG. 4, the flanges 73, 74 of the second forked structure 72 are substantially parallel to and laterally displaced from to the flanges 63, 64 of the first forked structure 62.

A through hole 60 facing into the cylindrical surface 61 is formed in the fixed member 13, to receive an attachment screw (not shown) for connecting to the seat of the seat-tube.

As can be seen more clearly in FIG. 2, the first forked structure 62 with its flanges 63 and 64 laterally embraces the first connecting rod 14 and supports the articulation pin 68 at the ends thereof. When a traction force is applied to the hook 27 of the actuation arm 25 by the derailleur control cable, the stress is transmitted from the actuation arm 25 into the articulation area at the pin 68. The stress is distributed through the central area of the pin 68, located between the two flanges 63 and 64, instead of being concentrated at one end, as in derailleurs of the prior art.

Figure 5:
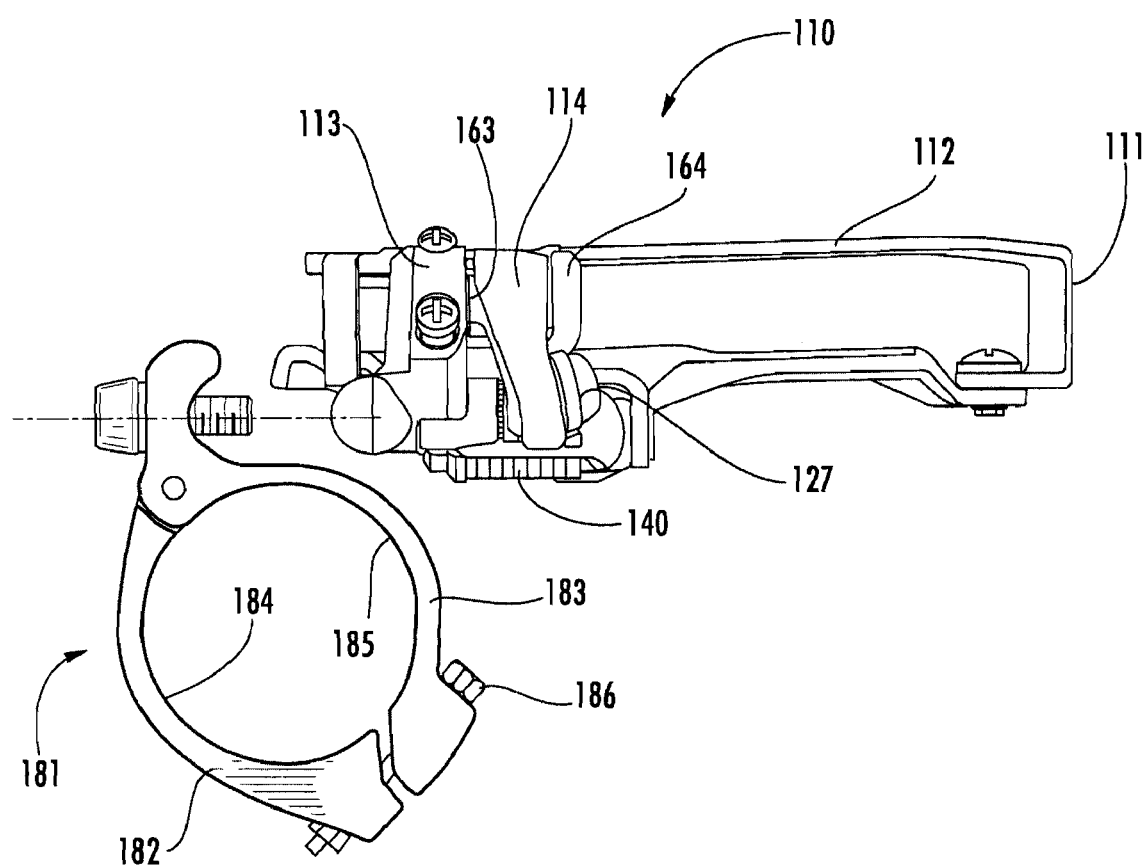
FIG. 5 is a partially exploded top view of a derailleur according to a second embodiment of the invention.
Figure 6:
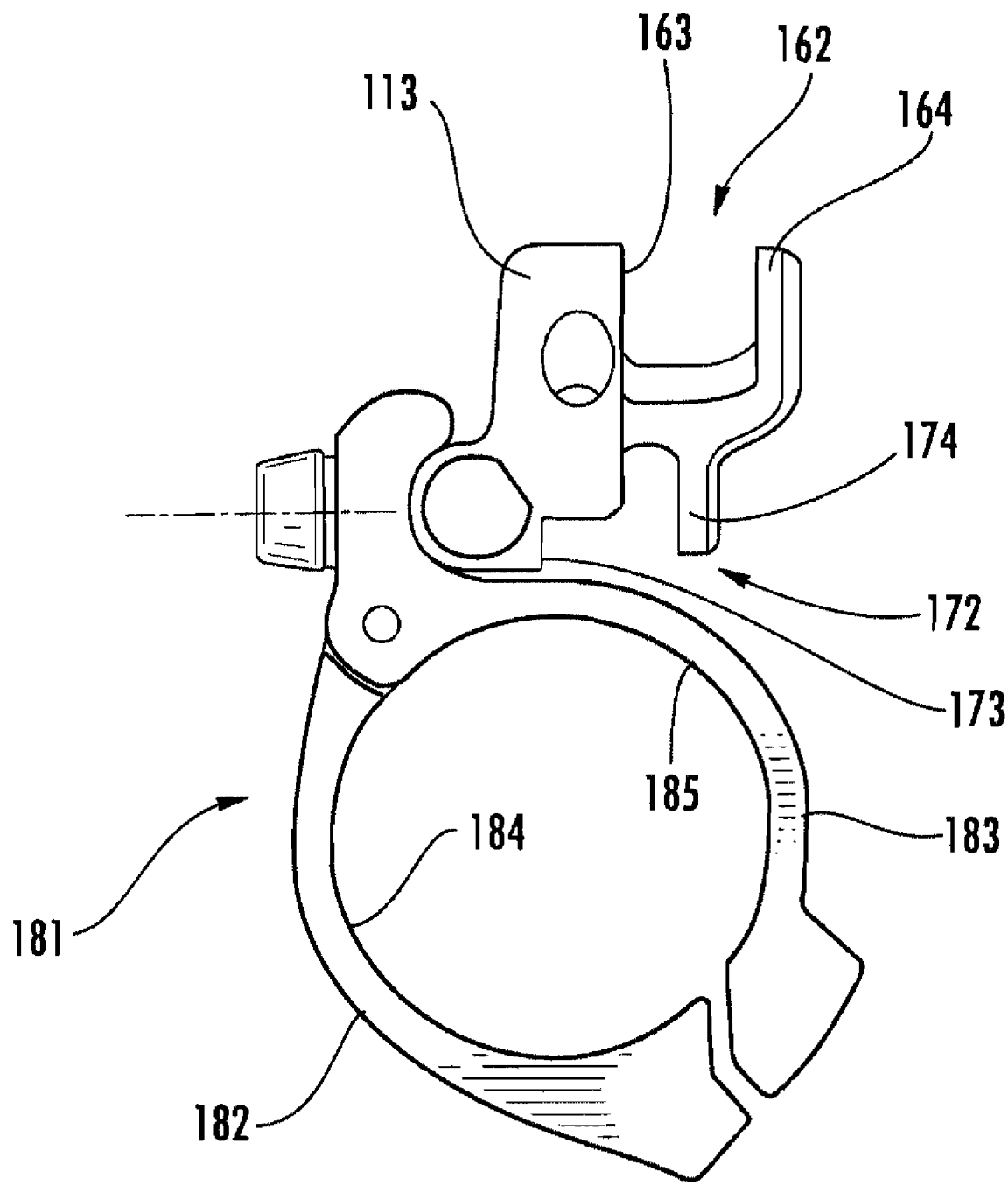
FIG. 6 is an enlarged view of the fixed member of the derailleur of FIG. 5.

FIGS. 5 and 6 show a view from above of an alternative embodiment of a derailleur 110 according to the present invention, which differs from the derailleur 10 described above in that it connects to the seat-tube, through a clamp attachment instead of in a seat with cylindrical surface.

The derailleur 110 is similar to that which is described above and shall only be described with respect to those features that differ from the first described embodiment. In FIGS. 5 and 6, the parts of the derailleur 110 that correspond to the derailleur 10 of FIG. 1 are indicated with the same reference numerals increased by 100.

In the derailleur 110, a clamp adapter element 181 is attached, preferably screwed, to the fixed member 113, to connect the derailleur 110 to the seat-tube of the bicycle. For this purpose, the clamp adapter element 181 comprises two semi-circular portions 182, 183, articulated together, to allow them to open out, with respective circular surfaces 184, 185 that are clamped on the frame by a bolt 186 when the derailleur 110 is in mounted configuration.

Figure 7:
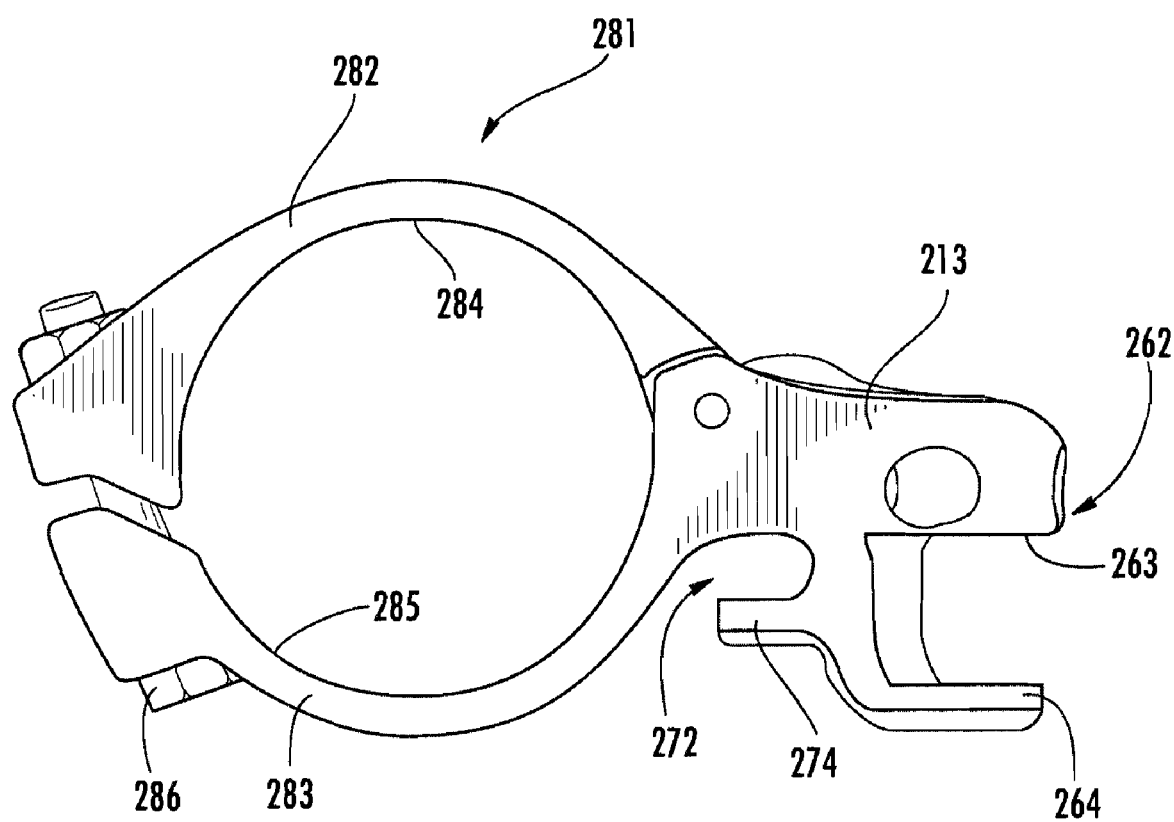
FIG. 7 is a view of a variant of a fixed member of the derailleur of FIG. 5.

FIG. 7 shows a variant 213 of the fixed member of the derailleur that differs from the fixed member 113 of FIGS. 5 and 6 in that it comprises two semi-circular portions 282, 283, articulated together, and having respective circular surfaces 284, 285 that are clamped on the frame by a bolt 286 when the derailleur is in its mounted configuration. The fixed member 213 is formed as a single piece with the semi-circular portion 283.

Figure 8:
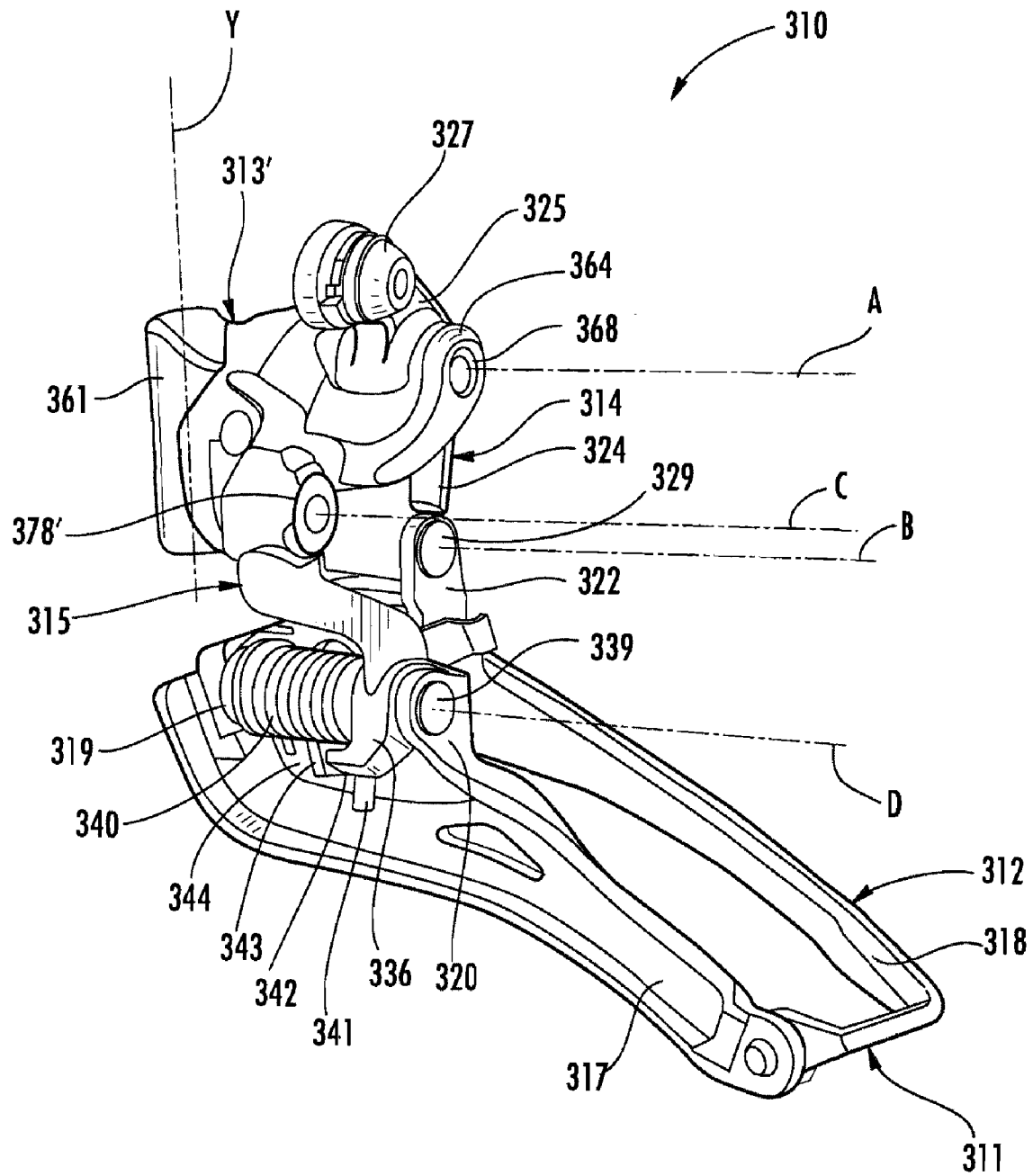
FIG. 8 is a perspective view of a derailleur according to a third embodiment of the invention.

FIG. 8 shows a perspective view of another embodiment of the derailleur 310, which comprises a fixed member 313' that differs from the fixed member 13 of the derailleur 10. The fixed member 313' is shown in greater detail in FIG. 9.

Figure 9:
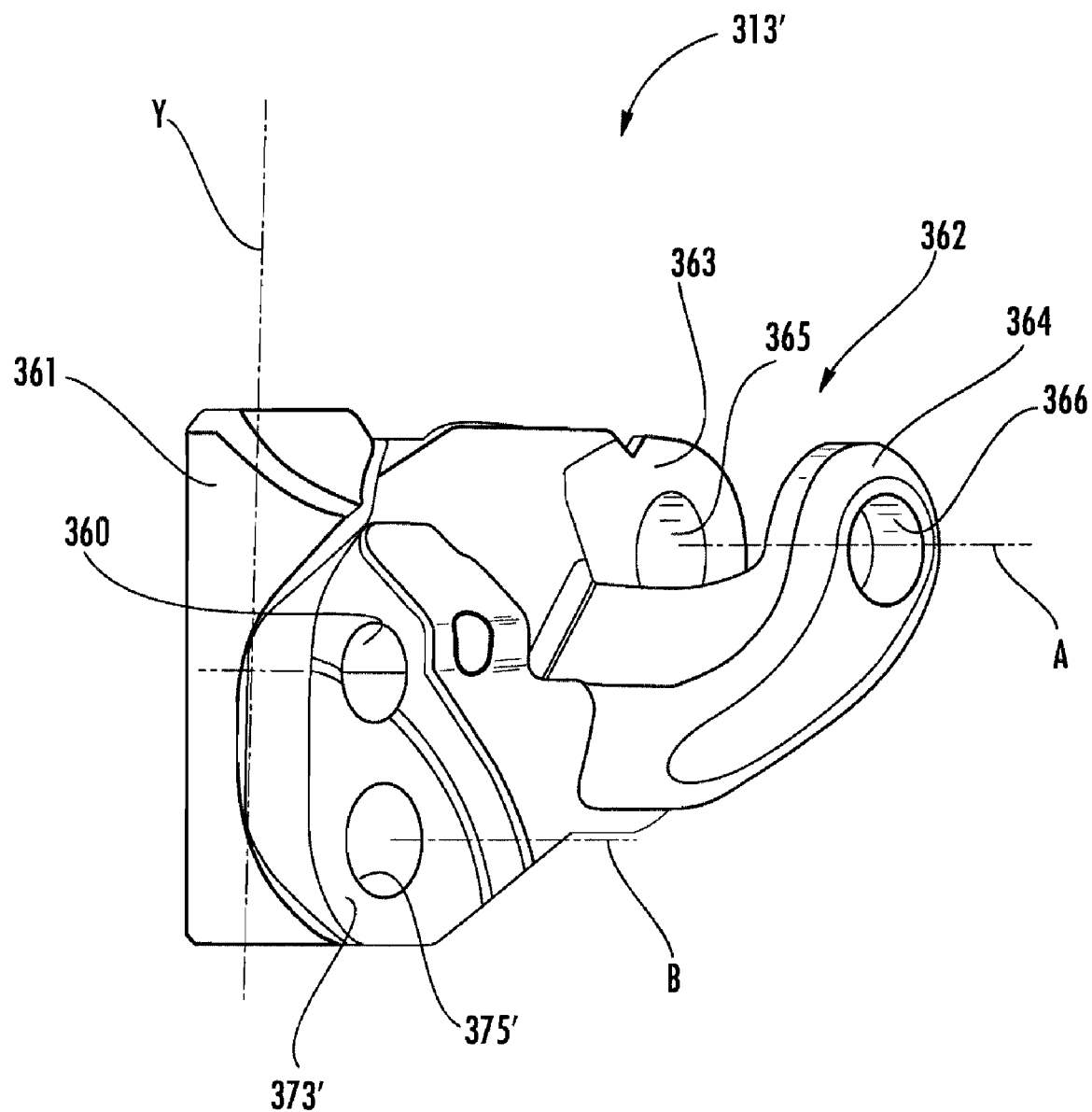
FIG. 9 is an enlarged perspective view of the fixed member of the derailleur of FIG. 8.

Aside from the fixed member 313', the derailleur 310 is similar to the derailleur 10. In FIGS. 8 and 9, the parts of the derailleur 310 that correspond to the derailleur 10 are indicated with the same reference numerals increased by 300.

The fixed member 313' shown in FIGS. 8 and 9 differs from the fixed member 13 of FIG. 1 only in the area of the articulation axis C. In this area, the fixed member 313' comprises a flange 373' provided with a hole 375' for receiving a pin 378' arranged cantilevered with respect to the flange 373'. The fixed member 313' does not have an additional flange facing the flange 373', as in the embodiment of FIG. 1. The second connecting rod 315 is connected to the fixed member 313' such that it is cantilevered on the pin 378', as can be seen in FIG. 8.

Other variations are possible, while still remaining covered by the present invention as defined by the following claims. For example, it is possible to make a derailleur similar to the derailleur 310 of FIG. 8, but suitable for connection to the bicycle like the derailleur 110 of FIG. 1, possibly with a fixed group like the group 213 of FIG. 7.

Furthermore, in the couplings between any of the described forked structures and connecting rods, it is possible for the pin to be formed as a single piece with the connecting rod and for the flanges of the forked structure to consequently be formed as two pieces, to permit mounting on the pin. Alternatively, the pin may be formed in two pieces and as part of a continuous structure with the flanges. The connecting rod is consequently formed in two pieces to permit mounting on the pin.

Furthermore, in the case of a motorized derailleur (also known as an automatic or electric derailleur) the driving area of the actuation arm of the first connecting rod can consist of a toothed sector engaged with a driving screw.

What is claimed is:

1. A front derailleur for a bicycle, comprising:
   a mobile member, provided with a chain-guide suitable for sliding engagement with a transmission chain of the bicycle and mobile between a first position and at least one second position;
   a fixed member, suitable for being fixed to a part of the bicycle frame;
   a first connecting rod, and a second connecting rod, hinged to the fixed member and to the mobile member, about four substantially parallel articulation axes so as to form a deformable articulated quadrilateral that moves the chain-guide between said first and said at least one second position;
   an actuation arm of said first connecting rod, provided with a driving area for controlling the derailleur through application of a thrust to the actuation arm so as to deform the deformable quadrilateral,
   wherein, at a first of said four articulation axes between the fixed member and the first connecting rod, the fixed member comprises a first forked structure that embraces the first connecting rod, and the first forked structure is defined by a first pair of flanges extending in a first direction, and at a third of said four articulation axes between the fixed member and the second connecting rod, the fixed member comprises a second forked structure that embraces the second connecting rod, and the second forked structure is defined by a second pair of flanges that extend in a second direction opposite from the first direction of the first pair of flanges, each flange of the second pair of flanges being substantially parallel to and laterally displaced, with respect to a corresponding flange of the first pair of flanges, in a same direction that is substantially perpendicular to the first direction.

2. The derailleur of claim 1, wherein the driving area on the actuation arm of the first connecting rod comprises a hook for receiving a derailleur control cable.

3. The derailleur of claim 2, further comprising an elastic return member, acting on the articulated quadrilateral in a first direction so as to push the chain-guide towards said first position, wherein the thrust applied by the cable to the hook acts in a second direction opposite to the first direction.

4. The derailleur of claim 1, wherein the flanges of the first forked structure are provided with respective holes aligned along the first articulation axis and the first connecting rod comprises a hole aligned with the first articulation axis, wherein a pin is inserted into the two holes of the first forked structure and into the hole of the first connecting rod.

5. The derailleur of claim 1, wherein the first connecting rod comprises a main arm extending between the first articulation axis and a second of said four articulation axes, between the first connecting rod and the mobile member, and wherein the main arm and the actuation arm substantially extend in the same plane perpendicular to the four articulation axes.

6. The derailleur of claim 1, wherein the flanges of the second forked structure are provided with respective holes aligned along the third articulation axis, wherein the second connecting rod comprises a hole aligned with the third articulation axis, and wherein a pin is inserted into the two holes of the second forked structure and into the hole of the second connecting rod.

7. The derailleur of claim 1, wherein, at a fourth of said four articulation axes between the second connecting rod and the mobile member, the mobile member comprises two opposite flanges perforated along the fourth articulation axis, wherein the second connecting rod comprises a hole aligned with the fourth articulation axis, and wherein a pin is inserted into the flanges and into the hole of the second connecting rod.

8. The derailleur of claim 3, wherein, at a fourth of said four articulation axes between the second connecting rod and the mobile member, the mobile member comprises two opposite flanges perforated along the fourth articulation axis, wherein the second connecting rod comprises a hole aligned with the fourth articulation axis, wherein a pin is inserted into the flanges and into the hole of the second connecting rod, and the elastic return member is a helical spring, mounted on the pin and provided with two ends, one engaged with an abutment tooth formed on the second connecting rod, the other engaged with an abutment portion formed on the mobile member.

9. The derailleur of claim 1, wherein the fixed member comprises a cylindrical portion for a braze-on attachment to the bicycle frame.

10. The derailleur of claim 1, wherein the fixed member comprises two semi-circular portions articulated together, and a clamping element for clamping the semi-circular portions about the part of the bicycle frame.

11. The derailleur of claim 10, wherein the fixed member is formed in one piece with one of the two articulated semi-circular portions.

12. The derailleur of claim 1, wherein the second connecting rod is substantially S-shaped, located between the third and a fourth of said four articulation axes, and extends between a first plane at the third articulation axis and a second plane at the fourth articulation axis, and wherein the first and the second planes are perpendicular to the four articulation axes and are spaced apart by a predetermined distance.

13. The derailleur of claim 1 wherein the second connecting rod comprises a lower portion and an upper portion, and a pair of screws are adjustably mounted to the fixed member such that they interfere with the upper portion of the second connecting rod to limit rotation of the second connecting rod and thus limit movement of the mobile member, defining extreme positions thereof.

14. The front derailleur of claim 13, wherein the extreme positions of the mobile member may be altered by screwing and unscrewing of the screws.

15. The front derailleur of claim 1, further comprising a clamp adapter element attached to the fixed member for attaching the derailleur to the seat tube of a bicycle.

16. The front derailleur of claim 15, wherein the clamp adapter element comprises two semi-circular portions that clamp around the seat tube and are fixed together by a bolt.

17. A front bicycle derailleur comprising:
   a mobile member that includes a chain guide;
   a stationary member, for fixing the derailleur to a bicycle frame, that has a first forked structure with apertures on a first articulation axis, the first forked structure being defined by a first pair of flanges extending in a first direction, and a second forked structure with apertures on a second articulation axis, the second forked structure being defined by a second pair of flanges that extend in a second direction opposite from the first direction of the first pair of flanges, each flange of the second pair of flanges being substantially parallel to and laterally displaced, with respect to a corresponding flange of the first pair of flanges, in a same direction that is substantially perpendicular to the first direction; and
   first and second connecting rods, hinged to the stationary member about the first and second articulation axes, each being positioned within the first or second pair of flanges of the first or second forked structure to transfer a force and cause movement of the mobile member through an actuation arm of one of the first or second connecting rods.

18. The front derailleur of claim 17, further comprising a second connecting rod hinged to the stationary member about a third articulation axis, and to the mobile member about a fourth articulation axis, such that the four articulation axes form an articulated quadrilateral.

19. The front derailleur of claim 18, wherein the articulated quadrilateral is deformed by a thrust to the actuation arm causing the mobile member to move.

20. A front derailleur for a bicycle, comprising:
   a cage, comprising an inner plate, outer plate, a pair of upper flanges, a pair of lower flanges, and a chain-guide suitable for sliding engagement with a transmission chain of the bicycle, wherein the cage is mobile between a first position and at least one second position;
   a stationary member comprising a first forked structure comprising a first pair of flanges extending in a first direction, and a second structure consisting of a single flange that extends in a second direction opposite from the first direction of the first pair of flanges, the second structure being substantially parallel to and laterally displaced, with respect to the first pair of flanges, in a third direction that is substantially perpendicular to the first direction;
   a first connecting rod, and a second connecting rod, hinged to the stationary member and to a mobile member, about first, second, third, and fourth articulation axes so as to form an articulated quadrilateral, able to be deformed so as to move the chain-guide between said first and said at least one second position, the first connecting rod having a main arm and an actuation arm for controlling the derailleur by deforming the articulated quadrilateral through application of force to a driving area for receiving a derailleur control cable, and the second connecting rod having a substantially S-shape including an upper portion, an intermediate portion, and a lower portion;

wherein, at the first articulation axis the two flanges of the first forked structure of the stationary member are pivotally connected to the first connecting rod by a pin inserted through respective holes in the flanges and a hole in the first connecting rod;

at the second articulation axis, the two upper flanges of the cage are hinged to the first connecting rod by a pin inserted through respective holes in the flanges and a hole in the first connecting rod;

at the third articulation axis, the single flange of the second structure of the stationary member includes a cantilevered pin, and the upper portion of the second connecting rod includes a hole aligned with the third articulation axis and inserted onto the cantilevered pin of the stationary member;

at the fourth articulation axis, the lower flanges of the cage are hinged to the lower portion of the second connecting rod by a pin inserted through respective holes in the flanges and a hole in the lower portion of the connecting rod, and an elastic return member is arranged about the axis having and end abutting a tooth of the lower portion of the second connecting rod.

21. A bicycle derailleur comprising:

a mobile member having a chain guide;

a stationary member attached a bicycle frame and including a first forked structure defined by a first pair of flanges extending in a first direction, and a second forked structure defined by a second pair of flanges that extend in a direction opposite from the first direction of the first pair of flanges, each flange of the second pair of flanges being substantially parallel to and laterally displaced, with respect to a corresponding flange of the first pair of flanges, in a same direction that is substantially perpendicular to the first direction; and first and second connecting rods having respective pivotal connections to each of the stationary member and the mobile member about four substantially parallel articulation axes to define a deformable articulated quadrilateral structure, the respective pivotal connections of each of the first and second connecting rods to the stationary member being formed at portions of the first and second connecting rods positioned within the first or second pair of flanges;

wherein at least one of the first or second connecting rods is substantially s-shaped and comprises a first end portion positioned within the first or second pair of flanges and a second end portion pivotally connected to the mobile member.

22. A bicycle derailleur comprising:

a mobile member having a chain guide;

a fixed member for attachment to a bicycle frame that includes a first forked structure defined by a first pair of flanges extending in a first direction, and a second forked defined by a second pair of flanges that extend in an direction opposite from the first direction of the first pair of flanges, each flange of the second pair of flanges being substantially parallel to and laterally spaced, with respect to a corresponding flange of the first pair of flanges, in a same direction that is substantially perpendicular to the first direction; and first and second connecting rods having respective pivotal connections about respective pins to each of the fixed member and the mobile member to define a deformable articulated quadrilateral structure that is deformed by an exerted force;

wherein the first or second forked structure surrounds the pivotal connection to the first or second connecting rod and distributes the force extended in a central area of the respective pin.

* * * * *